United States Patent [19]
Bruno et al.

[11] Patent Number: 5,408,089
[45] Date of Patent: Apr. 18, 1995

[54] OBJECT DETECTION SYSTEM WITH A PLURALITY OF DETECTORS FOR MOVEABLE STORAGE UNIT SYSTEMS AND WORK AREAS HAVING EXITS

[75] Inventors: Gerald R. Bruno, Saddle Brook; Avner Davidian, Edison, both of N.J.

[73] Assignee: White Storage & Retrieval Systems, Inc., Kenilworth, N.J.

[21] Appl. No.: 116,136

[22] Filed: Sep. 2, 1993

[51] Int. Cl.⁶ ............................................. G01V 9/04
[52] U.S. Cl. .................. 250/221; 250/561; 312/201; 340/541
[58] Field of Search .................. 250/221, 222.1, 561; 340/555–557, 540, 541; 312/201

[56] References Cited

U.S. PATENT DOCUMENTS

| | | | |
|---|---|---|---|
| 3,805,061 | 4/1974 | DeMissimy et al. | 250/221 |
| 3,903,996 | 9/1975 | Berkovitz et al. | 250/221 |
| 4,266,124 | 5/1981 | Weber et al. | 250/221 |
| 4,307,922 | 12/1981 | Rhodes, Jr. | 312/201 |
| 4,629,883 | 12/1986 | Geiger | 340/556 |
| 4,749,853 | 6/1988 | Salim | 250/221 |
| 4,783,618 | 11/1988 | Artrip | 312/201 |
| 4,794,248 | 12/1988 | Gray | 250/221 |
| 4,818,866 | 4/1989 | Weber | 250/221 |
| 5,015,840 | 5/1991 | Blau | 250/221 |
| 5,121,975 | 6/1992 | Dahnert | 312/201 |
| 5,130,532 | 7/1992 | Clemens | 340/555 |
| 5,160,190 | 11/1992 | Farrell et al. | 312/201 |
| 5,198,661 | 3/1993 | Anderson et al. | 250/221 |
| 5,218,196 | 6/1993 | Dogul et al. | 340/556 |

OTHER PUBLICATIONS

Brochure entitled "Spacesaver Tech Data," The Spacesaver Group, Spacesaver Corporation, 1993.

*Primary Examiner*—David C. Nelms
*Assistant Examiner*—Stephone B. Allen
*Attorney, Agent, or Firm*—Lerner, David, Littenberg, Krumholz & Mentlik

[57] ABSTRACT

A storage system with movable units is equipped with emitters for providing a series of radiant energy beams directed along an array of parallel paths through passages beneath the movable units. A control computer stops movement of the movable units in response to blockage of any path. Additionally, the system compares the identities of paths blocked on one cycle with those blocked on a prior cycle to determine whether unblocking of a path is due to a person or other object leaving the work area or is due by a condition in which the system has lost track of the person or object. In the latter case, the system inhibits operation of the movable units even if all paths are unblocked.

22 Claims, 8 Drawing Sheets

© 1993 WHITE STORAGE & RETRIEVAL SYSTEMS, INC.

© 1993 WHITE STORAGE & RETRIEVAL SYSTEMS, INC.

© 1993 WHITE STORAGE & RETRIEVAL SYSTEMS, INC.

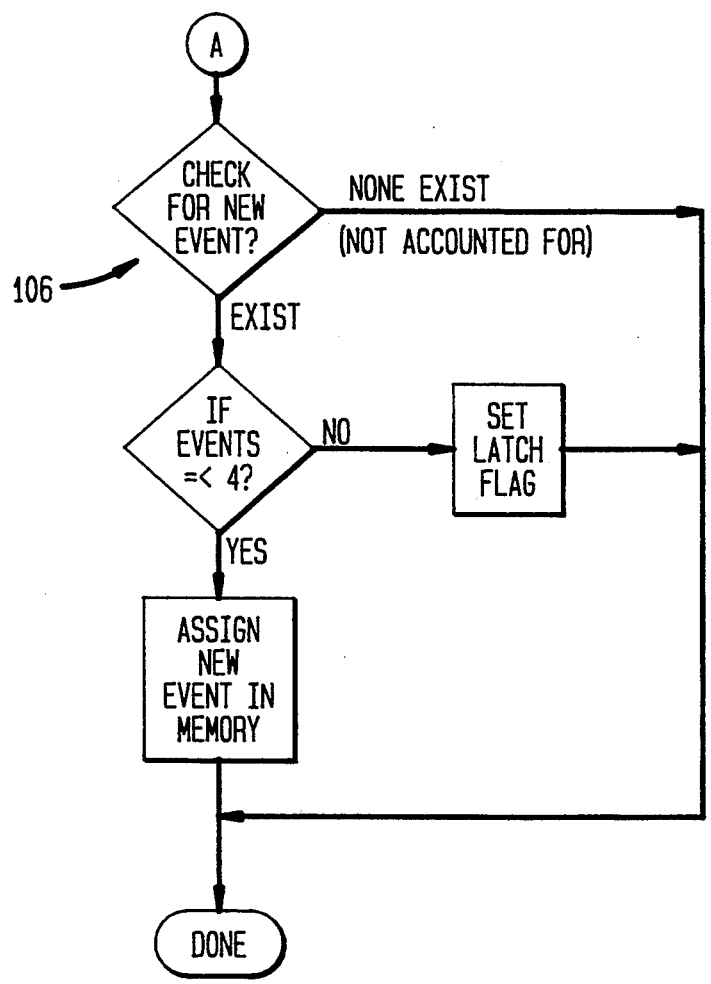

FIG. 7

© 1993 WHITE STORAGE & RETRIEVAL SYSTEMS, INC.

```
8E00FF14390A143C10143F061426081406E01409187F00227F00207F00217F00
0C7F00281428507F002ABDF89DBDF893CE0046BDF909BDF779BDF78FBDF89886
1E974B1504E0CEFA78DF53BDF9094F5F974D974A97AA9745DDA0DDB0DDA2DDB2
DDA4DDB4DDBACE00556F00088C007926F80E120401117EF7A3526F6265727420
4D696B75736B69960343914227138655973A86AA973A1504E0CEFA54BDF90920
ED1200010BCEFA481504E0BDF90920C27D00422724BDF185BDF31A96454C9745
810A2605145A10200A8114250C7F0045145A08BDF78FBDF6AB12000209CEFA44
1504A07EF16C964D270D135A02094A974D260497559756135A022F155A02DE53
262C965B270B4A975B2606DE57DF53201DCE0075A6002608088C007823F62013
4AA70026F3CEFA58DF53DE5327051504E02039DE55263513044034CEFA581271
022A127202261273022212742021ECEFA40D66DDA6EDA6FDA70270E1504A04FD6
5DBDF8AACE004620031404A0BDF90912044004130410037EF0721404E0CE0000
DF537EF066DCBAC30001DDBA7F0040155A40CE005D6F00088C006525F87D0042
26013918CE005D0F140020DC0EC300FADD18C30010DD16C3003CDD1C86019741
140C401420C014211086949723142290145A180E135A40FC7F0044964027F512
5A0435914222317C00AA186D000260518A7002024D64018E000C10D220518A701
201618081808188C006525E31504E0DE532605CEFA5CDF53125A40FC91432606
7EF2FF7EF29520AC130080241504A01459047D005B2609C678D75BCEFA6CDF57
7D004D2618C63CD74DCEFA6CDF55200D15590426087F005BCE0000DF57130408
241504A01459017D005B2609C678D75BCEFA74DF577D004D2618C63CD74DCEFA
74DF55200D15590126087F005BCE0000DF577EF1D4120080241504A01459087D
005B2609C678D75BCEFA68DF577D004D2618C63CD74DCEFA68DF55200D155908
26087F005BCE0000DF57120408241504A01459027D005B2609C678D75BCEFA70
DF577D004D2618C63CD74DCEFA70DF55200D15590226087F005BCE0000DF5713
5A40FC125A40FC7F00227F00207F00217F000C155A1815003839CE005D18CE00
65E60027156D012703EB015418E700080818088C006525E9200C186F00080818
088C006525F47F005C966DA70427037C005C966EA70527037C005C966FA70627
037C005C9670A70727037C005CA60026037EF6007D005C26037EF600186D0027
2B1271022718A0002401408100221DA600976D6F00186F007A005C810B233C90
4240810B23351471017EF5F7A600186D01272B12720022718A0012401408100D22
1DA600976E6F00186F017A005C810B230A904240810B23031472017EF5F7A600
186D02272B12730022718A0022401408100D221DA600976F6F00186F027A005C81
0B23D8904240810B23D11473017EF5F7A600186D03272B12740022718A0032401
40810D221DA60097706F00186F037A005C810B234F904240810B23481474017E
F5F7A600810B2307904240810B22037EF52613710231A60018E600272AC10B23
26D04250C10B231F18A0002401481FF2215A600976D1571027F00756F00186F
007A005C7EF5F713720231A60018E601272AC10B2326D04250C10B231F18A001
24014081FF2215A600976E1572027F00766F00186F017A005C7EF5F713730231
A60018E602272AC10B2326D04250C10B231F18A00224014081FF2215A600976F
1573027F00776F00186F027A005C7EF5F7137402F9A60018E60327F2C10B23EE
D04250C10B23E718A00324014081FF22DDA60097701574027F00786F00186F03
7A005C7EF5F713710231A60018E600272AC10B2307D04250C10B221F18A00024
0140810B2215A600976D1571027F00756F00186F007A005C7EF5F713720231A6
0018E601272AC10B2307D04250C10B221F18A0012401481FF2215A600976E15
72027F00766F00186F017A005C7EF5F713730231A60018E602272AC10B2307D0
4250C10B231F18A00224014081FF2215A600976F1573027F00776F00186F027A
005C7EF5F71374022EA60018E6032727C10B2307D04250C10B231C18A0032401
4081FF2212A60097701574027F00786F00186F037A005C088C006927037EF36D
18A600275081002329042408100232318A60081012315904240810123E18A6
00810B2307904240810B2215C608181F080110186F00186F04186F08186F0C20
```

FIG. 8
Ⓒ 1993 WHITE STORAGE & RETRIEVAL SYSTEMS, INC.

```
14C678181E08020D18E70C1504A0181C0806186F001808188C006D26A37EF660
CE006518CE006DA6002607088C006926F639186D0027151808188C007126F315
04E0DE532605CEFA5CDF5339188C007127ED18A700810B230B904240810B2304
181C0401088C006926BD397F0040155A407D0042260139BDF88CDC0EC300FADD
18C30010DD16C3003CDD1C86039741140C401420C0142110869497231 4229013
5A40FC155A40964027F5914323037EF7667D00452737135A04241504A0145920
7D005B2609C678D75BCEFA60DF577D004D26CCC63CD74DCEFA60DF5520C11559
2026087F005BCE0000DF5720B2135A04251504A01459107D005B2609C678D75B
CEFA64DF577D004D2695C63CD74DCEFA64DF557EF6DF15591026087F005BCE00
00DF577EF6DF7F00227F00207F00217F000C155A181500383996034397425F04
040404484848485D27028B109743391500384FBDF88C140018BDF88C1500184A
26F139150480155A18140C401420C0142110869497231 42290BDF78F7F004014
0020BDF88CD6405CD14222EDD740140018BDF8931500384FBDF903145A20125A
4413135A021E125A800ECEFA4CBDF909145A80200C155A40CE0046BDF909155A
80155A028655973A86AA973ABDF7791304011CBDF898130401157F00227F0020
7F00217F000C155A3ABDF78F7EF072135A2010C606D50426A5BDF898D504269E
155A201304020ABDF898130402037EF7C513040489BDF89813040482D6405A26
02D642BDF78F7F00401 40020BDF88C96404C914223037EF7D797401 40018BDF8
931500385A26E5D6407EF7D7CE00210926FD39CE014A20F7CE138820F23CCE00
46CC2020ED00ED023839DD4F860A9751C6047F0052CE00112006965290512A03
0C200397520D79005079004F09270579005220E69652365A26D8324D26035A86
209746324D27035F20055D270286209747324D27035F20055D27028620974832
974939BDF8AACE00464FBDF9D5BDF9D5BDF9D5BDF9D58601BDF9D518CEF9DCE6
03C12026034F2009183C183A18A6001838E602C120270A183C183A18E6191838
1BBDF9D5E601C12026034F2009183C183A18A6001838E600C120270A183C183A
18E61918381BBDF9D518CEFA0EE600C12026034F2009183C183A18A6001838E6
01C120270A183C183A18E61918381BBDF9D5E602C12026034F2009183C183A18
A6001838E603C120270A183C183A18E61918381B132980FC152840C60B482405
140808200315080814081015081 05A26EC14284039132980FC972A39E080D0D0
B07070C0F0F0F03060907070100020101010F010300E080D0D0B07070C0F0F0F
03060907070100020101010F0103E020C0602060E020E020A0E0C0E0C080C020
C0A020E08080800E020C0602060E020E020A0E0C0E0C080C020C0A020E080808
200C12172012151020120A1820202020200C0016200F0A12200D1105200C1318
20170E10200E131420170B0120170B00200E0B01200E0B0020080808DC18C300
FADD18C30010DD16868097238655973A3BDC16C3003CDD1C86AA973A12230403
155A04861497237A0041264A2014125A0410964481 02240A4C9744145A048607
2029145A40135A080E14000813002007DCB0C30001DDB0135A100E1400101300
2007DCA0C30001DDA0860897417C004A2603145A023B9641 81072704155A403B
145A04135A18EE7C0040150038 3B868097253B3B8E00FF1439081426081406E0
1409187F00227F00207F00217F000C1424807F00281428507F002ABDF89DCE00
46BDF909BDF78F861E974B7F004D7F004A7F00451504E0CEFA50DF53BDF909CE
00556F00088C007926F80E7EF0727EFB137EFB137EFB137EFB137EFB0E7E
FB137EFA917EFB137EFB137EFA7C7EFB137EFB137EFB137EFB137EFB13
7EFB137EFB147EFB147EFB147EF000FB13FB13FB13FB13FB0EFB13FA91FB13
FB13FA7CFB13FB13FB13FB13FB13FB13FB13FB14FB14FB14F000
```

OBJECT DETECTION SYSTEM WITH A PLURALITY OF DETECTORS FOR MOVEABLE STORAGE UNIT SYSTEMS AND WORK AREAS HAVING EXITS

COPYRIGHT STATEMENT

A portion of the disclosure of this patent document contains material which is subject to copyright protection. The copyright owner has no objection to facsimile reproduction by anyone of the patent document or the patent disclosure, as it appears in the Patent and Trademark Office file or records, but otherwise reserves all copyright rights whatsoever.

BACKGROUND OF THE INVENTION

The present invention relates to object detection systems, and more particularly relates to systems for detecting objects, including personnel, in the aisles of a moveable unit storage system.

Moveable unit storage systems incorporate a plurality of storage units, such as shelves, racks and the like. These units are arranged to move relative to one another so as to open and close aisles between different pairs of adjacent storage units. Such systems include two end units spaced apart from one another in a movement direction and middle units disposed in a work area, between the end units. Typically, the middle units are mounted on wheels and guided by tracks so that they can only move in preselected movement directions towards and away from the end units. The distance between the end units is sufficient to accommodate all of the middle units plus one or a few aisles. If an aisle exists between two middle units or between one middle unit and one end unit, one middle unit can be moved into the aisle, thus closing the original aisle and opening a new aisle between the moved middle unit and another unit. Systems of this nature are particularly advantageous because they conserve space, and hence conserve all of the costs associated with building construction and operation. The user can still have full aisle access to all of the storage units, but need allocate building space for only one aisle or a few aisles.

In the larger systems of this nature, the storage units are moved by powered devices such as electric motors under manual or automatic control. In these systems, safety devices are employed to avoid actuating the units to close an aisle while a person is in the aisle. One common safety device employs mechanical bumpers extending along the length of each storage unit, i.e., along the storage unit in the direction transverse to the movement directions. At least one such bumper is provided between each pair of adjacent storage units. Each bumper is linked to electrical switches. If the bumper encounters a person or other object in the aisle as the storage units move toward one another to close that aisle, the bumper trips the electrical switches. The switches in turn are connected so that when tripped, they will stop the closing motion, as by interrupting current to the driving motors or by applying brakes or catches to the moving elements.

Bumper-based safety systems are effective, but have certain drawbacks. The safety system will not stop the moving units until one or both of the units have come close enough to the person within the aisle for the bumpers to touch him or her. Even though the person is not endangered, he or she may be frightened by the moving units. As disclosed, for example, in U.S. Pat. Nos. 4,307,922 and 4,783,618, a mechanical bumper system may be supplemented with electronic proximity sponsors on each unit, such as heat-sensitive or capacitive sensors. Typically, only relatively few sensors are disposed along the length of each storage unit, so that each sensor must provide protection for a substantial portion of the adjacent aisle. In a variant of that approach, disclosed in U.S. Pat. No. 5,121,975, each storage unit is provided with a lamp and photocell. These are mounted on a lengthwise edge of the unit so that the lamp projects a beam in the lengthwise direction along the edge of the unit to the photocell.

The beam is interrupted by a person or object in the aisle as the unit moves toward the next adjacent unit to close the aisle. Yet another system, disclosed in U.S. Pat. No. 5,160,190, mounts a small radar device to each storage unit so that the radar device will point downwardly, into the aisle when such storage unit is adjacent an open aisle.

All of the aforementioned systems are costly and complex in that they require components mounted to each of the individual storage units. The number of such components increases proportionately with the number of storage units in the system. The complexity and possibility for failure of the system increase exponentially with the increasing numbers of components. Although such systems can be arranged for "fail safe" operation, so that failure of any single component locks the system rather than allowing the system to operate in a potentially dangerous or frightening mode, such fail safe operation does not provide a complete solution to the problem. Productivity can be substantially hampered by failure of the safety system, leading to attempts to disable or circumvent the safety system. Yet another system mentioned in passing in the aforementioned '190 patent, utilizes moveable floor sections and switches actuated by depression of such moveable floor sections when a person stands upon them. As noted in the '190 patent, this arrangement has a substantial drawback in that it requires installation of special moveable flooring and switches associated therewith.

Another drawback encountered in many of the prior systems is that the same often are arranged to detect persons or objects only at or adjacent the floor level, i.e., at the bottoms of the storage units. For example, as disclosed in the aforementioned '975 patent, the lamp and photocell are arranged along the bottom edge of each unit. A person working in an aisle in such a storage system can climb up along the storage unit as, for example, to reach an object on a high shelf. This may occur even where such practice is expressly prohibited by the owner of the system. Accordingly, it would be desirable if the safety system could effectively inhibit closure of an aisle when an individual is within the aisle even where the individual has climbed above floor level.

Thus, there have been substantial unmet needs heretofore for improvements in storage systems with moveable storage units, and there have been similar needs for improvement in safety systems for this and other applications.

SUMMARY OF THE INVENTION

One aspect of the present invention provides an improvement in a storage system of the type having a floor and a plurality of storage units disposed in a work area above the floor. Typically, the storage units include two end units based apart from one another in a movement direction and at least one middle unit disposed therebetween. At least one of the storage units, normally the middle unit or units, is or are moveable in movement directions toward and away from the other storage units so as to open and close aisles at interfaces between adjacent ones of the storage units. The improvement according to the present invention includes means for defining at least one passageway extending in the movement direction across each middle unit. Preferably, each middle unit is elevated above the floor so that the passageway is defined between the bottom of the middle unit and the floor. The system includes means for detecting radiant energy such as infrared light at a detection location and providing a detector signal bearing information as to whether or not such radiant energy is detected, and further includes means for emitting radiant energy at an emission location and directing the radiant energy in a movement direction from the emitting means to the detection location. Thus, the radiant energy passes in the movement direction across each interface between adjacent storage units and hence across each aisle and through each of the aforementioned passageways enroute to the detection location.

The apparatus further includes means for determining, from the detector signal, whether or not an object is present in any aisle between the storage units. Typically, the emission location and the detection location are at ends of the work area and may be in the end units. The means for detecting includes desirably a plurality of detectors disposed in an array at one end of the work area extending across the work area in a lengthwise horizontal direction transverse to the movement directions, and the means for emitting includes a plurality of emitters disposed in a similar array extending lengthwise across the work area so that one emitter is aligned with each detector. The passageway-defining means is arranged so that each passageway extending across one middle unit is aligned with passageways across each other middle unit. Typically, there is one or a few large passageways extending the length of each middle unit. That is, essentially the entire space beneath each middle unit may be open, except for the wheels or other supports holding the middle unit up above the floor. The beams of radiant energy, typically infrared light, passing from the emitters to the detectors are arrayed across the entire lengthwise direction of the work area, i.e., over the entire extent of the floor transverse to the movement directions. Each beam extends essentially over the entire extent of the floor in the movement directions, and extends across every open aisle. Thus, any person or object resting on the floor in any open aisle will interrupt one or more of the beams. Although a plurality of detectors and emitters can be employed, the number of detectors and emitters does not increase with the number of middle units. In the most preferred arrangements, there is no need to provide any detector or emitter or other specialized equipment to the middle units.

Preferably, the system includes means for actuating each emitter in an intermittent or time-varying pattern, and the means for detecting includes means for actuating each detector in synchronism with the associated emitter and providing a blocked-path signal for each detector if the detector does not detect the energy from the associated emitter. For example, where the emitters are actuated intermittently, each detector is actuated intermittently, at the same time as the associated emitter. Thus, each detector will respond only to energy from the correct emitter. There is no need for precise focusing or collimation of the energy from individual emitters into narrow, precise beams and hence economical optical elements can be employed. Moreover, cross-impingement of energy from one emitter on the detector associated with a different emitter can be employed in particularly preferred arrangements for providing a redundant cross-check and fault isolation in a testing cycle.

A system according to this aspect of the present invention most preferably includes logic means for monitoring changes in blocked-path signals with time and determining from those changes whether cessation of a blocked-path signal is caused by lateral movement of the object which previously caused a blocked-path signal out of the working area as, for example, when a person in an aisle leaves the aisle and, if not, issuing a lost-object signal. Such a lost-object signal, for example, would be issued where a person standing on the floor within the aisle and blocking one or more beams of radiant energy climbs up the storage unit, thereby unblocking the light beams while still remaining within the aisle. The system is arranged to inhibit movement of the storage units responsive either to the blocked-path signal or to the lost-object signal.

A further aspect of the invention provides an apparatus for detecting the presence of an object in a work area having an exit, as, for example, within the work area of a moveable storage unit system as discussed above. Apparatus according to this aspect of the invention includes means for emitting radiant energy along a plurality of paths within the working area. The paths are disposed in an array including paths disposed close to the exit and paths disposed further from the exit. The apparatus further includes means for detecting radiant energy emitted along each path and providing a blocked-path signal associated with that path when such energy is not detected, so that each such blocked-path signal represents an object present in the associated path. Apparatus according to this aspect of the invention further includes logic means for monitoring the blocked-path signals and monitoring changes in such signals with time. The logic means is arranged to provide an object-present signal if a blocked-path signal is present. Moreover, the logic means is arranged to determine, from changes in the blocked-path signals, whether or not an object represented by one or more blocked-path signals at a prior time has moved out of the working area through the exit, and to issue a lost-object signal if a blocked path signal associated with an object ceases but the changes in blocked-path signals do not indicate that the object has moved out of the work area through the exit. Most preferably, the logic means is arranged to issue a lost object signal if a blocked-path signal associated with one or more paths remote from the exit ceases but a blocked-path signal does not commence on at least one adjacent path within a preselected interval. Typically, a logic means is arranged to operate cyclically, so as to check for blocked-path signals associated with each path in sequence, and to issue the lost object signal if a blocked-path signal associated with a path remote from the exit ceases on any cycle but a blocked-path signal associated with an adjacent path does not appear on that cycle.

The logic means may also include means for distinguishing between unitary objects and multiple objects based upon the location of paths for which blocked-path signals are present. Such recognition may be based upon a maximum distance between paths which a single object, such as a single person, would block. If two paths spaced apart from one another by more than such maximum distance are blocked, the logic means will treat the two blockages as caused by two separate objects. Thus, where a blocked-path signal detected on one cycle changes to two closely adjacent blocked-path signals, the system continues to treat those blocked-path signals as a single event representing only a single object. However, if the blocked-path signals move further from one another so as to exceed the maximum event distance, the system will treat the same blocked-path signals as indicating two separate objects. The apparatus may further include means for inhibiting operation of apparatus in the work area as, for example, for prohibiting movement of mobile storage units arranged to travel within the work area, whenever the logic means indicates that an object is present, and in response to the lost object signal. The inhibition means may be arranged to remove the inhibition automatically whenever the tracking means indicates that the object formerly present: is no longer present, i.e., when the tracking means indicates that the object present in the work area has passed out through the exit. However, the inhibition means may be arranged to require manual resetting to remove the inhibition after occurrence of a lost object signal. The logic used in preferred systems according to this aspect of the present invention substantially improves the reliability of the system and, in particular, virtually eliminates the possibility of a "false negative" reading, i.e., a reading indicating that a blocked path signal has disappeared when the object which originally caused that blocked path signal is still present in the work area as, for example, when a person climbs upon a storage unit and thus escapes the reach of the radiant energy beams.

These and other objects, features and advantages of the present invention will be more readily apparent from the detailed description of the preferred embodiments set forth below, taken in conjunction with the accompanying drawings.

BRIEF DESCRIPTION OF THE DRAWINGS

FIGS. 5 and 6 are further flow charts which cooperatively depict another step of the process shown in FIG. 3.

FIGS. 7 and 8 are listings of microprocessor code utilized to implement the steps of FIGS. 3-6.

DETAILED DESCRIPTION OF THE PREFERRED EMBODIMENTS

Figure 1:
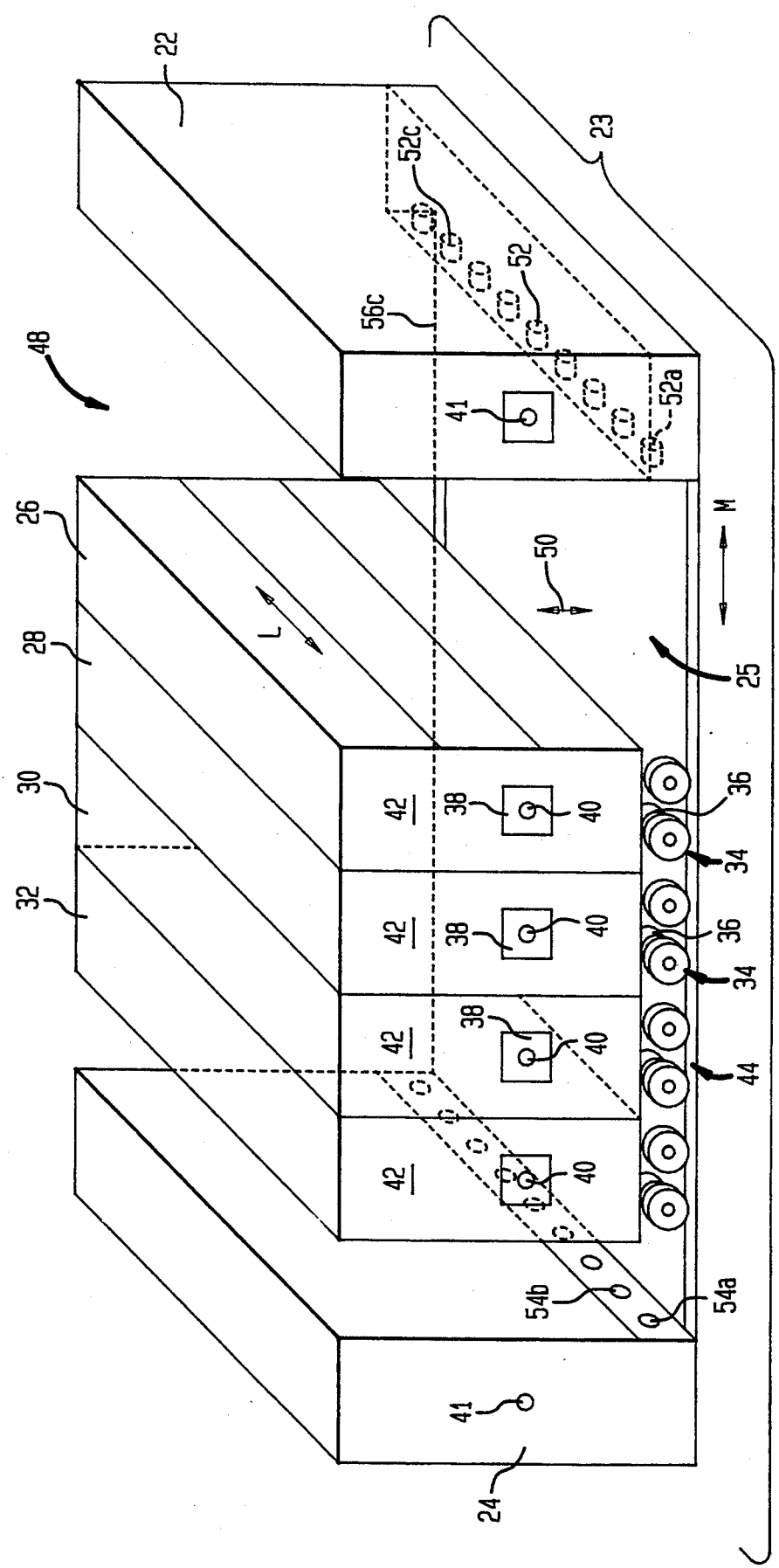
FIG. 1 is a diagramatic perspective view depicting certain elements of a storage unit in accordance with one embodiment of the invention.
Figure 2:
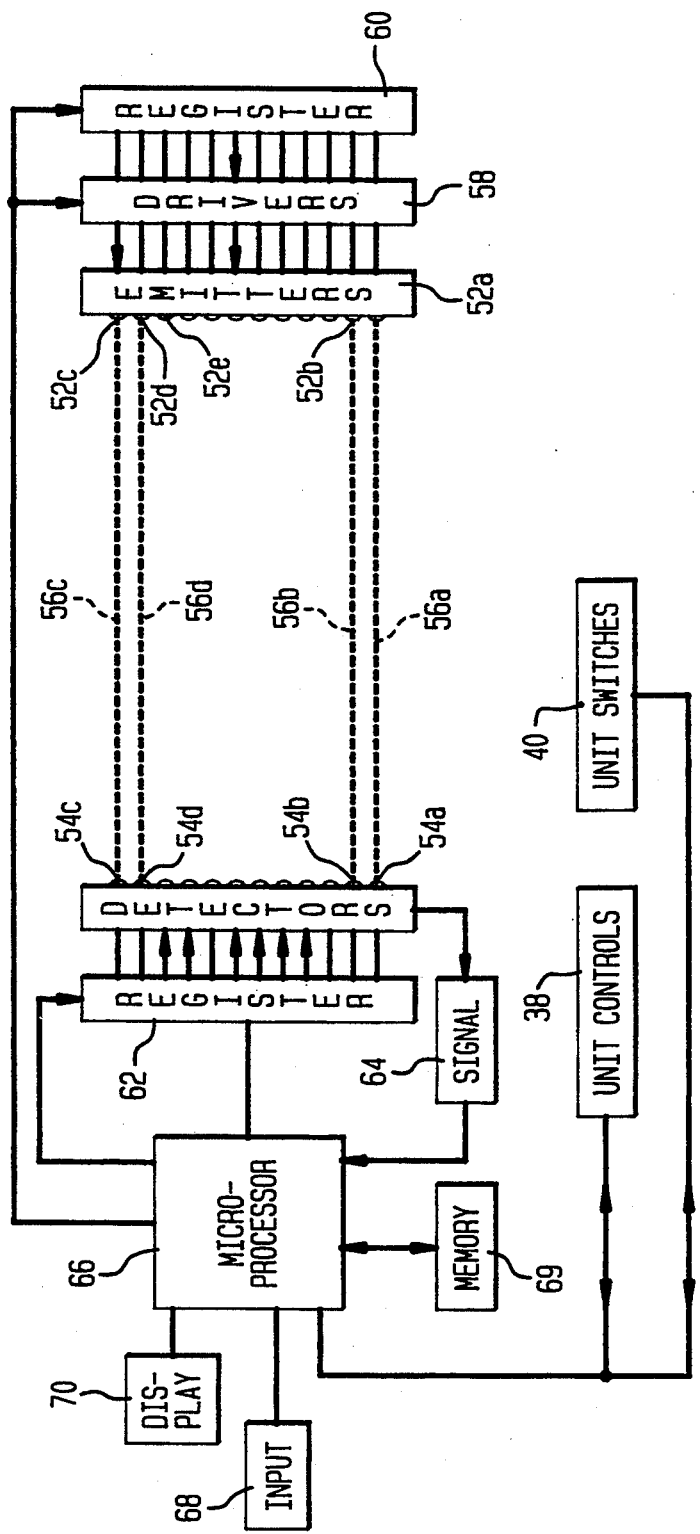
FIG. 2 is a block diagramatic view of certain components utilized in the storage system of FIG. 1.

A storage system in accordance with one embodiment of the present invention includes a pair of end storage units 22 and 24 mounted in fixed position to the floor or other supporting structure 23 of a building, the end units being spaced apart from one another in movement directions M, i.e., the directions to the right and left in FIG. 1. Each end unit 22 and 24 extends in lengthwise directions transversely to the movement direction, i.e., to the front and back in FIG. 1, so that the end units extend generally parallel to one another and define opposite ends of a work area 25. The system further includes four middle units 26, 28, 30 and 32 disposed between end units 22 and 24, above the floor in work area 25. The middle units are mounted by wheels 34, of which only some are visible in FIG. 1, on tracks 36 so that the middle units can move only in the movement directions. Each middle unit is equipped with a drive motor 36 linked via appropriate power and control wiring to an individual unit controller 38 mounted on the middle unit itself. All of the middle units are elongated, and extend in the lengthwise directions, generally parallel to one another and to end units 22 and 24, and transverse to the movement directions. Each middle unit has an exit end face 42, the end faces of all of the end units being disposed along an exit edge 44 of work area 25. In the particular installation illustrated, edge 44 is the only place where a person can enter or leave the work area; the opposite edge is closed by a wall or other barrier (not shown). Each middle unit is also provided with a unit reset switch 40 mounted on the exit end face 42 of that middle unit. Similar reset switches 41 may also be provided on the faces of end units 22 and 24 adjacent exit edge 44 of the work area.

Unit control devices 38 can actuate motors 36 to drive the middle units in the movement directions, thereby opening and closing aisles between each middle unit and each adjacent middle or end unit. For example, an aisle 48 is present between middle unit 26 and end unit 22. By moving unit 26 to the right while leaving unit 28 in place, aisle 24 may be closed and a new aisle (not shown) may be opened between unit 26 and 28. In operation, personnel and equipment will pass into each aisle while the same is open so as to retrieve items stored on the adjacent storage units.

Unit controls 38 are conventional devices as, for example, of the type used in the storage system sold under the registered trademark AISLE SAVER by White Storage & Retrieval Systems, Inc. of Kenilworth, N.J. In this system, each individual unit control can be commanded by a supervisory controller (not shown) to bring its middle unit to a specified position. The individual unit controls can also be commanded to hold the middle units in place. Further, the unit controls are arranged to communicate with one another so that when one unit is in a stopped condition, the adjacent unit will also be stopped from moving in to the stopped unit.

Wheels 34 are arranged to support each middle unit 26, 28, 30, 32 above the surface of the floor, so that there is an open gap 50 between the bottom of each middle unit and the floor. Such gap extends beneath substantially the entire length of each middle unit, except for those areas occupied by wheels 34, by drive motor 36 and by other elements such as frame members (not shown). Moreover, each such gap extends entirely across the middle unit in the movement directions, i.e., to the left and right in FIG. 1. As the middle units are aligned with one another in the lengthwise direction, the gaps 50 of the individual middle units are aligned with one another in the lengthwise direction L. The various gaps beneath all of the various middle units form a continuous gap or opening extending in the movement directions across all of the middle units. Such gaps, together with any aisles present between units, form a continuous opening immediately above the floor, encompassing the entire extent of the work area 25 in the movement directions M, from end unit 22 at one of the work area to end unit 24 at the other end. This open path also covers substantially the entire lengthwise extent L of the work area, from exit edge 44 to the opposite edge.

The system according to the present invention further includes an array of light emitting units 52 mounted to the bottom of end unit 22 and a corresponding array of light detecting units 54 mounted to the opposite end unit 24. Each light emitting unit 52 incorporates a light emitting diode arranged to emit infrared light and a plano-convex lens arranged to focus the light from such diode into a beam. Each light detecting unit 54 incorporates a phototransistor and an input lens arranged to focus light onto the phototransistor. The emitting units 52 are arranged side by side in an array extending in the lengthwise direction across substantially the entire work area 25. Emitting units 52 are spaced at intervals of approximately three inches (approximately 76 mm) from one another. The photodetectors 54 are arranged at similar spacings, so that each photodetector 54 is aligned with one emitter 52 on a path 56 extending between such photo emitter and photodetector in the movement directions. For example, emitter 52a adjacent the exit edge 44 of the work area is aligned with photodetector 54a, also adjacent the exit edge 44 on a path 56a extending in the movement direction. The next adjacent emitter 52b is aligned with detector 54b on another, parallel path 56b and so on. All of the paths 56 extend across all open aisles between units and across all of the middle units 26-32 via the passageways or gaps 50 beneath the middle units.

Emitters 52 are connected to conventional driver circuitry 58, which in turn is connected to a shift register 60. Driver circuitry 58 and shift register 60 are arranged so that a bit clocked through shift register 60 will enable the individual emitters 52 in sequence. Driver circuitry 58 is also arranged to accept a strobe signal and amplitude modulate the light output by the enabled emitter 52 in accordance with such strobe signal.

A shift register 62 is linked to photodetectors 54 through appropriate drivers (not shown) so that each photodetector is actuated only when a bit being clocked through the register is disposed at a particular point in the register. Preferably, the photodetectors 54 are phototransistors and the drivers are arranged to apply emitter bias voltage to each phototransistor only when the appropriate position in the register is occupied by a bit. The outputs of the phototransistors are connected through a signal conditioning and amplification circuit 64. Circuit 64 includes a wide band filter section arranged to strip DC components from the photodetector output signals but to pass components of such photodetector output signals within a wide range of frequencies, encompassing the range of strobe or modulation frequencies applied to the emitters 52 as discussed below. Circuit 64 further includes a multistage amplification section and a comparator section arranged to provide a thresholding action, i.e., either a first, low output if the signal from the photodetectors is above a certain level or a second, high output if the signal from the photodetectors is below such threshold.

The output from signal conditioning circuit 64 is connected to an input of a microprocessor 66. Microprocessor 66 may be of any convenient type. However, the type sold by Motorola, Inc. of Schaumburg, Ill. under the designation XC68HC711D3FS can be used satisfactorily. This type of microprocessor can operate according to the code set forth in hexadecimal form in FIGS. 7 and 8. FIG. 7 shows the first part of the code; FIG. 8 shows the second part. Microprocessor 66 is linked to a memory 69, an alphanumeric display 70 and input devices 68 such as a keypad and connectors to higher level supervisory control units as required. The microprocessor is also connected to the individual control units 38 of middle units 26, 28, 30 and 32 and to the individual unit reset switches 40 mounted on the exit end faces 42 of the middle units. Such linkage may be effected through any appropriate cables or through free space communication such as radiofrequency or optical communication channels. Each unit control 38 is provided with sensors (not shown) for detecting whether or not the middle unit associated with such control is or is not abutting another middle or end unit, to thereby determine whether or not the middle unit associated with the particular control is or is not adjacent to an aisle.

Figure 3:
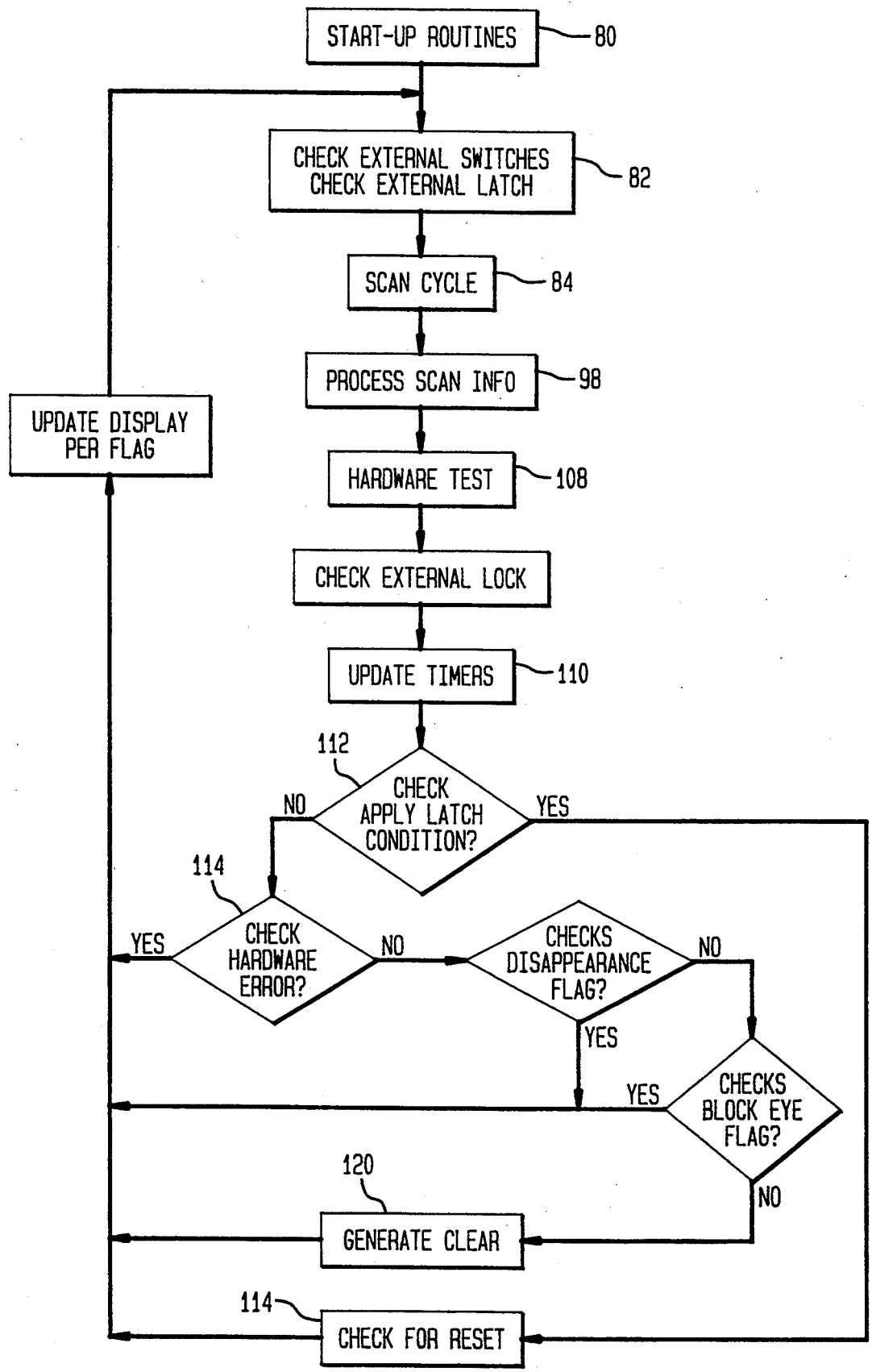
FIG. 3 is a flow chart depicting certain steps in operation of the apparatus of FIGS. 1-2.

Microprocessor 66 and the associated elements are arranged to execute a cycle as illustrated in FIG. 3. In startup routines 80 the microprocessor initializes all registers and tests the microprocessor itself and associated memories for proper operation. After such startup routines, the system begins a run cycle. In the first stage of the cycle, the system checks input devices 68 to determine whether or not a latch signal has been received. If so, the microprocessor sets a latch flag on. The external latch command signal may be given for example by a supervisory controller or by a manual switch. If the latch flag is turned on, it will remain on until reset as discussed below. However, if no external latch input is received by the microprocessor, the latch signal is not turned on at this stage of the process.

Figure 4:
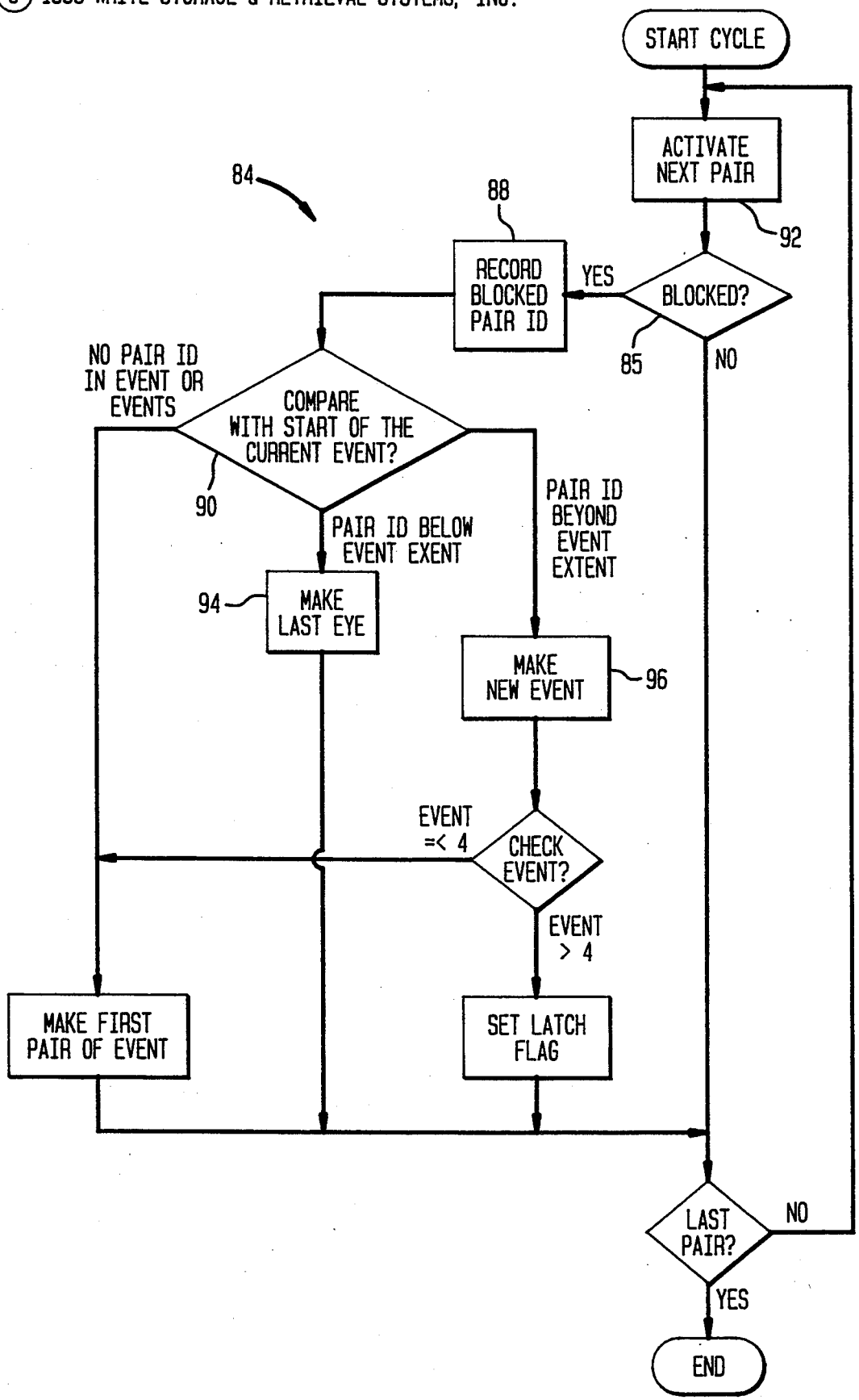
FIG. 4 is a further flow chart depicting in greater detail one step of the operations illustrated in FIG. 3.

In the next stage of the process, the microprocessor executes a scan cycle 84, shown in greater detail in FIG. 4. In the scan cycle, the microprocessor actuates the emitters 52 and detectors 54 in sequence, so that each emitter and the associated detector are actuated simultaneously. Thus, the emitter detector pair 52c and 54c, aligned with one another on path 56c furthest from the exit edge 44 of the work area is activated first, followed by the next adjacent emitter and detector 52d and 54d on path 56d, and so on until the emitter-detector pair 52a, 54a on path 56a at the exit edge 44 are activated. To activate the various pairs in sequence, microprocessor 66 clocks a bit through each shift register 60, 62 simultaneously, so that each emitter is activated at the same time as the associated detector. At any given time during this scan cycle, only one emitter and only one detector are activated. During the scan cycle, microprocessor 66 also sends a series of strobe bits to drivers 58. Drivers 58 pulse the output of the particular emitter 52 which is activated at the time in accordance with the strobe bits, so that the light output by the emitter is pulsed on and off in synchronism with the one and zero values of the strobe bits.

Light from each emitter passes along the associated path 56 to the associated detector 54. Of course, if a person or object in the work area 25 of the floor, that person will block the light and substantially prevent its reaching the appropriate detector 54. In this regard, some light from each emitter 52 may, and typically will, reach detectors 54 other than the particular detector associated with that emitter. However, any such stray light will be of no effect because such other detector is inactive. If the path 56 across the work area 25 of the floor is not blocked, the particular photodetector 54 which is activated will receive light from the associated emitter 52, pulsing on and off in accordance with the strobe signal. The output signal from the photodetector array will likewise pulse on and off in accordance with the strobe signal, leading the comparator output from signal conditioning circuit 64 to go high and low repeatedly in accordance with the strobe signal.

The microprocessor compares the output signal from signal conditioning unit 64 with the strobe signal itself. If the output signal is varying in accordance with the strobe signal, then the microprocessor treats the path associated with the emitter detector pair in use at the time as clear. If not, the microprocessor treats the path associated with the particular pair in use at the time as blocked. (Decision 85, FIG. 4). If a particular pair is not blocked, the microprocessor takes no action with respect to that pair, and simply checks whether or not the pair then being activated is the last pair. If it is the last pair, the scan cycle ends. If not, the microprocessor activates the next pair in sequence. (Loop 92, FIG. 4) If a pair is found to be blocked, the microprocessor branches to step 88, in which it records the blocked pair identification in memory. The blocked pair identification typically is recorded as a sequence number. Thus, each emitter/detector pair, and hence each path 56 between an emitter and a detector is referred to by a pair number corresponding to the location of that pair in the order, from pair 52c/54c (pair number 1) to pair 52a/54a (pair number 16, assuming that there are 16 pairs in all). At this stage, the microprocessor also sets a blocked pair flag.

The microprocessor then assigns the blocked pair to an "event". As used herein, the term "event" refers to a series of adjacent blocked pairs which the system will treat as representing a single object or person in the work area. The blocked pairs constituting an event may be either contiguous or noncontiguous. Stated another way, there may be one or more unblocked pairs between two blocked pairs constituting the start and end of a single event. However, the system imposes an upper limit on the extent of any event. Thus, if the distance, and hence the difference in pair number between blocked pairs is greater than a preset maximum event extent, the system will treat the two blocked pairs as belonging to different events. The system records the identities of the first and last pairs belonging to each event. However, in the first stage 90 of the process for assigning blocked pairs to events, the system compares the blocked pair identification with the starting pair identification of the "current" event, i.e., the last event started during this scan cycle. If the blocked pair is the first blocked pair detected on this scan cycle, then the microprocessor records the blocked pair identification as the first pair identification of the first event detected. Assuming that the blocked pair detected is not the last pair, the system returns via path 92 to check the next pair. If the system again encounters a blocked pair, it again records that identification and branches to step 90. At this point, the previously recorded blocked pair is in memory as the start of the current event. The pair number for the newly detected blocked pair is compared with that previously recorded starting pair number. If the difference between the two pair numbers is less than the preset maximum event extent, the system will record the newly detected blocked pair identification as the last pair in the current event (process 94), the system again cycles (assuming that the last pair of the array has not been checked) through branch 92. If the system again encounters a blocked pair, it will again return to test stage 90, and will again test the identification of the newly detected blocked pair against the first-detected starting pair identification for the current event. If the distance, and hence the difference in pair numbers, between the newly detected blocked pair and the first blocked pair of the current event is greater than the preselected maximum event extent, the system will branch to a new event cycle 96. Preferably, the maximum event extent is about 30 inches, i.e., about 10 pair numbers. In new event cycles, the system treats the pair number for the newly detected blocked pair as the starting pair identification of a new event, and records that new event as the current event. Additionally, the system checks the total number of events detected in the current scan cycle. If that number exceeds a preset maximum capacity, typically four events, the system treats the condition as an overload and sets a latch flag. If no such overload condition is detected, the system assigns the newly detected blocked pair identification as the starting pair of the current event, and continues looping through branch 92. If a subsequent pair is detected as blocked, that pair identification is now compared with the starting pair identification of the new current event. If the newly detected blocked pair is within the maximum extent of that starting pair, it will be recorded as a new value for the last or ending pair identification (process 94) for the same event. If the difference between the pair identification for the newly detected blocked pair and the starting pair identification for the new current event is greater than the maximum event extent, the system will branch to process 96, make a new event, check the total numbers of events and, assuming it is less than the maximum number, record the new blocked pair as the starting pair of a new current event. Any event may include one, two or more blocked pairs, up to the maximum number of blocked pairs permitted by the maximum event extent. Each event includes a first pair identification and a last pair identification. If an event includes only one blocked pair, so that no last pair identification is ever set via step 94, then the system will record the last pair identification for that event as equal to the first pair identification for the same event.

Figure 5:
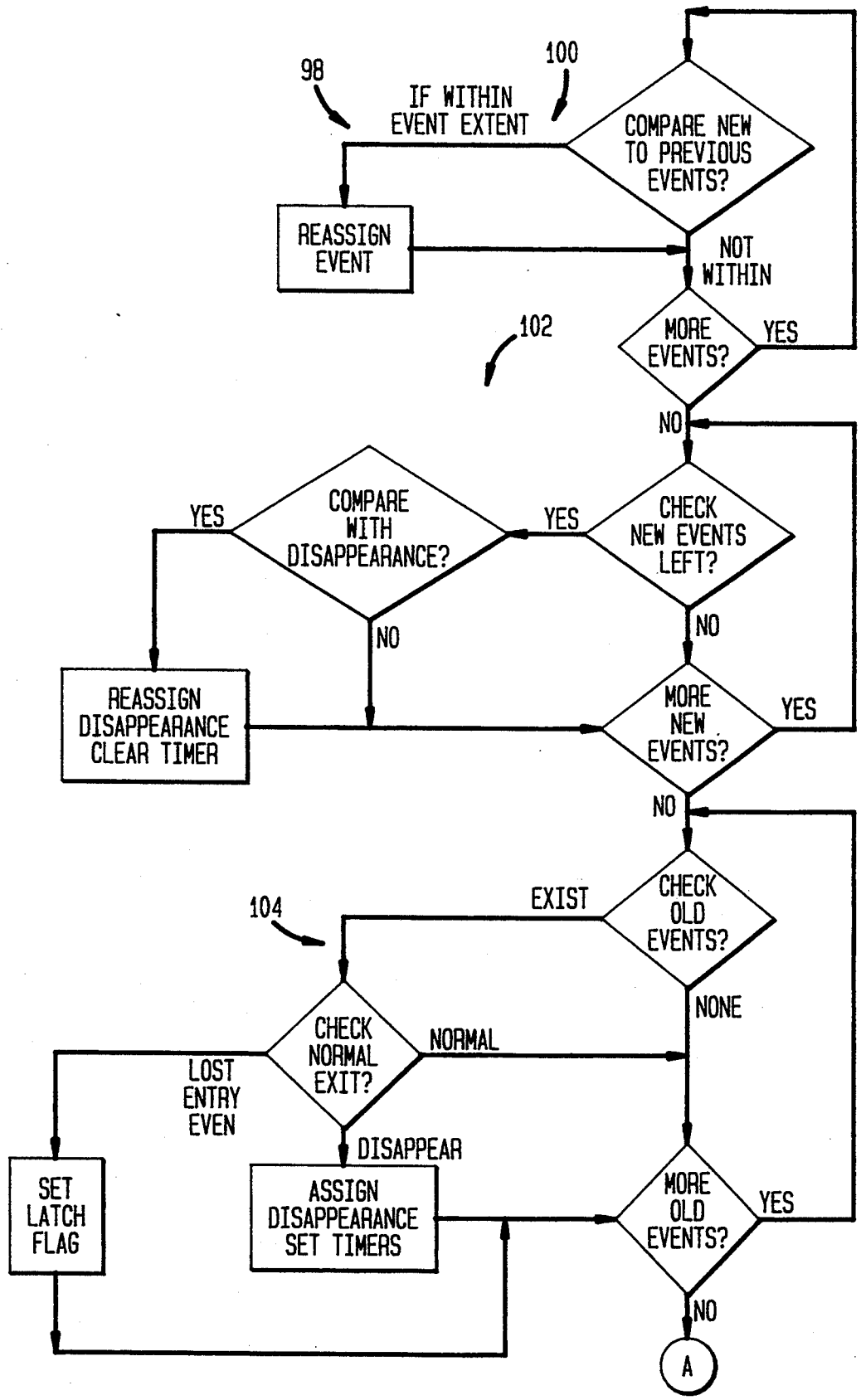

After looping through this process, the system ultimately determines that it has activated the last pair, and the scan cycle 84 ends. At this point, the system has stored in memory starting and ending blocked pairs for up to four newly-found events and, if more than four events were detected, the system has set a latch flag. The microprocessor now passes into the information processing cycle 98 shown in detail in FIGS. 5–6. In this stage, the system calculates and stores a midpoint for each new event, halfway between the first and last blocked pairs constituting such event. The system compares the events newly found on the past scan cycle 84 just completed with "old" events, held in memory from the preceding cycle. As the first stage in the scan information processing routine 98, the system checks each new event against the prior events. If the midpoint of a new event falls within a maximum midpoint distance from the midpoint of an old event, then the old event is "reassigned." That is, the old event is deleted from memory and the new event is tagged as corresponding to the old event. The maximum distance used in this state may be the same as the maximum event extent used in stage 84. This loop 100 continues until all new events have been compared with all old events.

In the next loop 102, if any new events are left which have not been tagged as corresponding to an old event, each such remaining new event is compared with any "disappearances" created on the previous scan information processing cycle. As further discussed below, a "disappearance" is created by the system if an old event cannot be accounted for by normal movement of the object out of the work area. As discussed below, each disappearance is recorded with the midpoint of the missing event and has an associated timer which is started when the disappearance is recorded. Thus, if any events disappeared unaccountably on previous cycles, there will be one or more disappearances stored in memory and one or more disappearance timers running. In loop 102, any new events which have passed through loop 100 without being tagged as corresponding to previous events are compared to the stored disappearances. If the midpoint of a new event is within the preset maximum midpoint distance from the midpoint stored for a disappearance, then the system reassigns the disappearance to the new event. The disappearance is deleted from memory, the associated timer is cleared and the new event is marked as corresponding to the previously-noted disappearance.

After checking all of the new events in loops 100 and 102, the system checks to see if any old events remain which have not been deleted in loop 100. If an old event was not deleted in loop 100, this indicates that an object which previously blocked a beam is no longer blocking a beam. If the object had merely moved within the work area, a new event would have been found within the maximum midpoint distance of the old event and the old event would have been deleted in loop 100. If an old event still remains in memory by the time the system reaches loop 104, the old event has either disappeared unaccountably or has exited from the system. In loop 104, the midpoint of the old event, as observed in the preceding cycle, is evaluated. If that stored midpoint is within a preselected exit zone, close to the exit edge 44 of the work area (FIG. 1) then the system assumes that the old event ceased to be observed on the current cycle because the object causing the event properly exited from the work area. Thus, if an old event remaining at loop 104 had a midpoint within an exit zone extending a specified distance from the exit edge 44 of the work area (if it has a high enough pair number midpoint) then the system will simply erase that old event. By contrast, if the midpoint of an old event is remote from the exit edge, i.e., if the midpoint of the old event is at a pair number below a preselected exit threshold and hence further outside of the exit zone, the system will treat the presence old event as indicating an unexplained disappearance. Thus, for each old event having a midpoint outside of the exit zone (more than a preselected distance from the exit edge of the work area) which remains at loop 104 the system will create a disappearance. In that process, the system sets a disappearance flag, records the midpoint of the lost event and starts a timer associated with such disappearance.

There is an exception to the processing discussed above with reference to loop 104 for any old event which has a "entry flag" associated therewith. As further discussed below, an entry flag is set when a new event arises within an entry zone, i.e., a new event having a midpoint within a preselected entry threshold from the exit edge 44 of the work area. As discussed in greater detail below, if the microprocessor spots a new event, not corresponding to any previous event in this entry zone, the new event is tagged with an entry flag. That entry flag is cleared when the event is reassigned as discussed below. Thus, if the system reaches loop 104 while still carrying in memory an event tagged with the entry flag, the system will treat it as a "lost entry" event and set a latch flag. A lost entry event effectively indicates that an object entered the system and then immediately disappeared, i.e., an anomalous condition which should not occur in normal operation.

In the next stage of the scan information processing cycle (FIG. 6) the microprocessor checks through loop 106 for any new events not previously assigned in loops 100 or 102. Here again, the system checks to see if the total new events, including any new events previously assigned, amount to less than the maximum event capacity in all. If there are too many events, the system sets the latch flag. If not, the system assigns each remaining new event and writes that new event into the memory. When the system assigns any new event to the event memory in loop 106, it tests the new event to see if the midpoint of the event being assigned is within the entry zone, i.e., within a preset distance of edge 44. If so, the system marks the event, when placed in event memory, with the entry flag. As discussed above, the entry flag is used to test for an anomalous disappearance in loop 104. Thus, at the conclusion of loop 106, the event memory will include only the "new" events found by the system during the immediate previous scan cycle. These "new" events will now serve as the "old" events in the next information processing cycle.

At the stage of the process, the system has set the blocked flag if any blocked pair was found in the immediate preceding scan cycle 84; has set a disappearance flag and started a disappearance timer if any event has disappeared, and has set latch flags if any anomalous condition exists. The system now passes into a hardware test cycle 108 (FIG. 3) in which the system tests the emitters 52 and detectors 54. In one stage of the test cycle, the microprocessor actuates shift register 60 and driver 58 to turn on several adjacent emitters 52 and actuates these multiple emitters with the same strobe signal. For example, the adjacent emitters 52c, 52d and 52e may be actuated simultaneously in this stage of the process. The microprocessor also actuates the photodetector 54 aligned with the center one of the multiple emitters, i.e., detector 54d aligned with emitter 52d. Because the light from each emitter impinges somewhat on the adjacent detectors as well as on the particular detector aligned with the emitter, detector 54d will be illuminated, to some extent, by emitters 52c, 52d and 52e. It is unlikely that all three emitters 52c, 52d and 52e would be faulty at any time. Accordingly, the output of signal processing unit 64 should include a signal varying in accordance with the strobe signal from the microprocessor, unless photodetector 54d is faulty. If no such signal is detected, the microprocessor sets a hardware error flag and records a code indicating which hardware element is faulty. Microprocessor 66 actuates additional sets of emitters and actuates additional detectors so as to test each detector in the same way. The microprocessor then actuates individual emitters 52 while actuating plural adjacent detectors, including the detector aligned with the particular emitter and the neighboring detectors on either side of the aligned detector. Here again, the light from each emitter should illuminate several adjacent detectors. It is extremely unlikely that all of the adjacent detectors actuated on such a test cycle will be faulty. Accordingly, if the output from the detector array through amplification unit 64 does not include a signal varying in accordance with the strobe signal, the microprocessor identifies the illuminator 52 which was actuated as faulty, there again, the hardware error flag is set and a code is recorded to indicate the faulty element. If a person is standing in an aisle during the hardware test cycle, the resulting beam obstruction may cause the hardware error condition even where all of the emitters 52 and detectors 54 are operating. Such an erroneous hardware error condition will not interfere with system operation, because it will only occur at the same time as a "blocked path" condition is already inhibiting system operation.

Following the hardware test cycle 108, the system checks for any externally applied lock signals, such as those applied through input 68. If such lock signals are found, the system sets a lock flag. In any next stage 110 of the process, the microprocessor updates any disappearance timers which were started in the previous scan information processing cycle or in any prior cycle. The elapsed disappearance time recorded on each such timer is updated in accordance with the microprocessor system clock. Also, if the elapsed disappearance time in any disappearance clock exceeds a preset disappearance maximum, preferably thirty seconds, the microprocessor sets a latch flag. This indicates that an event which disappeared has not reappeared in the maximum time permitted, another anomalous condition.

In the next stage 112 of the process, the microprocessor tests for any existing latch flags. Such latch flags may result, for example, from an externally applied latch signal (step 82) or from an overload condition in which more than four events were detected or from the loss of an event while such event still bears the entry flag (loop 104, FIG. 5) i.e., where an object enters the system and then immediately disappears. Also, a latch flag may exist if a disappearance timer has exceeded the preset disappearance maximum (step 110). If a latch flag is detected, the microprocessor passes through step 114, wherein it tests for the inputs received from middle unit reset switches 40 to see if a reset signal has been received. If so, the microprocessor clears the latch flags and resumes operation at step 82. If not, however, the microprocessor issues a latch command to the middle unit controls 38 of each middle unit disposed adjacent to an aisle, thereby causing such units to stop in place, and ultimately causing adjacent units, which detect the stopped condition of these units, also to stop in place. The system actuates display 70 to indicate a latched condition, and resumes the cycle with step 82, discussed above. When the system actuates display 70 to indicate a latch condition, it may display a particular code or message depending upon the cause of the latched condition, and may also actuate an alarm such as a bell, flashing light or the like. If the system enters a latched condition, it will remain in the latched condition through successive cycles regardless of any change in the original cause of latched condition. That is, a latch flag, once set, will only be reset by the microprocessor if the microprocessor has received a reset signal from the manually actuated middle unit switches 40.

If there is no latched condition, the system tests to see if the hardware error flag was set in the last previous hardware test cycle 108. If so, the system passes out of the loop at step 114, without issuing either a clear signal or a latch signal. If there is no hardware error, the system tests for the presence or absence of a disappearance flag. Again, if there is such a disappearance flag, the system exits from the loop without issuing a clear signal or a latch signal. Finally, the system tests for presence of the blocked path flag. If there is such a blocked path flag, the system again exits from the loop without issuing a clear signal. However, if there is no hardware error flag, no disappearance flag and no blocked path flag, the microprocessor generates a clear signal at step 120 and updates the display 70 accordingly.

In response to the clear signal, each middle unit control 38 frees itself to operate responsive to other external inputs (not shown) as from a supervisory controller or manual control, so as to actuate the associated motor 36 and move the middle unit as required to rearrange the aisles. If no clear signal is generated by microprocessor 66, the middle unit control 38 will not operate, and hence will remain locked, so long as the clear signal is absent. In effect, the absence of any clear signal serves as a lock signal disabling the unit controls and the associated motors for so long as the lock signal persists. However, because the lock signal consists only of the absence of a clear signal, the system is "fail safe." If the system encounters a fault which prevents it from issuing any signal, the individual middle unit will treat the absence of a signal as a lock signal.

If the lock signal is issued, i.e., if the clear signal is not issued, on a particular cycle through the system as shown in FIG. 3, the lock signal can be reversed, and a clear signal issued, automatically on the next cycle depending upon the results encountered in the steps of the new cycle. Thus, the hardware error flag, disappearance flag and blocked path flag can each be cleared automatically, depending upon the signals received in scanning the photoemitter and photodetector arrays. If a scan cycle 84 (FIG. 4) is passed without encountering any blocked paths, the blocked path flag is cleared. Likewise, the disappearance flag is cleared when disappearances are reassigned in the scan information processing; (loop 102, FIG. 5) and the hardware error flag is cleared if a newly conducted hardware test cycle 108 (FIG. 3) indicates no errors. Thus, conditions which cause locked signals inhibit operation of the storage units only momentarily. These conditions are encountered during normal operations. For example, the blocked path condition will occur whenever a person or other object enters an aisle, and the disappearance flag may be set momentarily if a person reaches or climbs up within an aisle for a brief period. Likewise, the hardware error may appear while a person is in the aisle, blocking several adjacent paths. When the system detects that these conditions have ceased, it automatically frees the middle units for operation. However, the conditions which cause a latch signal, such as the anomalous disappearance of an object immediately upon its entry, or the prolonged disappearance of an object in the middle of the work area, without the object passing out of the exit zone, indicate an abnormal condition requiring the attention of a human operator. Those conditions cannot be cleared without the manual operation of the reset switches.

As will be readily appreciated, numerous variations and combinations of the features discussed above can be utilized without departing from the present invention. Essentially any member of photoemitters and photodetectors can be used side by side, and the system can include essentially any number of middle units, more or less than the four middle units shown. In the system as illustrated, the middle units move as the end units remain stationary. However, the same system can be applied when the end units move. Merely by way of example, in a very large system including many middle units, emitters and detectors can be mounted on a few of the movable middle units, so that those units serve as end units for the other middle units disposed therebetween. The emitters and detectors need not be mounted on the storage units, but instead can be mounted on separate structures. The positions of the emitters and detectors can be reversed from that shown in FIG. 1. Also, the device can incorporate emitters and detectors at both ends of the work area. Thus, there may be an array of emitters and detectors interspersed in alternating order at each end of the work area, so that the emitters at each end cooperate with the detectors at the opposite end.

Also, although the system illustrated in FIG. 1 has only one exit edge, exactly the same operations can be performed with a system having two exit edges. In such case, the entry zones and exit zones discussed above would be defined for both exit edges. Thus, an event passing out of the work area through the exit zone on either side of the work area would be considered as a normal exit. In that case, the system at loop 104 would compare the midpoint of an old event with one threshold representing the maximum pair number for the border of one exit zone and with another threshold representing minimum pair number for the border of the opposite exit zone.

The detection and logic systems can be applied to work areas which do not have movable storage systems associated therewith. For example, the photoemitter-photodetector system and logic described above can be used to check for the presence or absence of persons in a hazardous process area.

In the system discussed above, the emitters and detectors utilize infrared light. However, other forms of radiant energy can be employed, for example, visible or ultraviolet light. Also, it is not essential to provide a separate emitter and a separate detector both for each radiant energy path in the system. For example, the system may include fiber optics, mirrors or other optical devices, for directing light from a single emitter along a plurality of paths, or for focusing light from plural paths onto a single detector.

As these and other variations and combinations can be used in the present invention, the foregoing descriptions of the preferred embodiments should be taken by way of illustration rather than by way of limitation of the present invention.

What is claimed is:

1. Apparatus for detecting the presence of an object in a work area having an exit, the apparatus comprising:
    (a) means for emitting radiant energy along a plurality of paths within said work area, said paths being disposed in an array including paths disposed closer to and further from said exit;
    (b) means for detecting the energy emitted along each path and providing a blocked-path signal associated with the path when said energy is not detected, whereby each blocked-path signal represents an object in the associated path; and
    (c) logic means for
        (i) monitoring said blocked-path signals and monitoring changes in such signals with time,
        (ii) providing a presence signal if a blocked-path signal is present at any time,
        (iii) determining from changes in said blocked path signals whether or not an object represented by a blocked-path signal at a prior time has moved out of said work area through said exit and
        (iv) issuing a lost-object signal if a blocked-path signal associated with an object ceases but said changes do not indicate that the object has moved out of the work area through the exit.

2. Apparatus as claimed in claim 1 wherein said logic means includes means for determining whether a blocked path signal which has ceased was previously caused by an object disposed in an exit zone adjacent said exit and, if so, treating such object as having passed out of the work area through the exit.

3. Apparatus as claimed in claim 2 wherein said logic means further includes means for determining from changes in said blocked path signals whether a blocked path signal associated with an object in an entry zone adjacent said exit has ceased immediately after such object was first detected and a blocked-path signal associated with an adjacent path has not commenced, and, if so, issuing a lost-entry latch signal.

4. Apparatus as claimed in claim 3 wherein said entry zone overlaps said exit zone and wherein said logic means is arranged to issue said latch signal if a blocked-path signal associated with an object disposed in said overlapping zones has ceased immediately after such object was first detected and a blocked-path signal associated with an adjacent path has not commenced.

5. Apparatus as claimed in claim 1 wherein said logic means includes means for issuing said lost-object signal if a blocked-path signal associated with a path remote from said exit ceases but a blocked-path signal does not commence on at least one adjacent path.

6. Apparatus as claimed in claim 5 wherein said logic means includes means for cyclically checking for blocked-path signals associated with each said path and issuing said lost-object signal if a blocked-path signal associated with a path remote from said exit ceases on any cycle but a blocked-path signal associated with an adjacent path does not appear on that cycle.

7. Apparatus as claimed in claim 1 wherein said logic means includes means for cyclically checking for blocked-path signals associated with said paths, means for creating a set of events based upon blocked path signals detected in each cycle so that each event represents one blocked path signal or a plurality of adjacent blocked path signals, means for storing the set of events created on each cycle and means for comparing the set of events created on each cycle with the set of events created on the prior cycle.

8. Apparatus as claimed in claim 7 wherein said means for creating a set of events includes means for computing distance between paths associated with blocked-path signals, and means for assigning such blocked path signals to events so that each event includes a starting blocked path signal and so that other blocked path signals detected on the same cycle are included in a particular event only if the paths associated with such other blocked path signals are within a preselected maximum event distance from the starting blocked path signal for such event.

9. Apparatus as claimed in claim 7 wherein said means for comparing the set of events includes means for determining locations for said events based upon the locations of paths represented by the blocked path signals included in the events, means for comparing the locations of events created in the current cycle with the locations of events created in a prior cycle, accounting for each event created in a prior cycle if the location of an event created in the current cycle is within a preselected maximum distance from the location of the prior cycle event, and issuing said lost-object signal if a prior-cycle event is not accounted for and if the location of such prior-cycle event was outside of an exit zone.

10. Apparatus as claimed in claim 9 wherein said logic means further includes means for recording a disappearance when a lost-object signal is issued with respect to an event, each such recorded disappearance including the location of the event for which the lost-object signal was issued, means for starting a timer associated with each such recorded disappearance, said logic means further including means for comparing the locations of events created in each cycle with the locations included in said recorded disappearances, deleting each said recorded disappearance and clearing the timer associated therewith if the location of an event created in the current cycle is within a preselected maximum distance from the location of the recorded disappearance, and issuing a latch signal if a timer associated with any recorded disappearance reaches a maximum time.

11. Apparatus as claimed in claim 1 wherein said means for emitting radiant energy includes a plurality of emitters and said means for detecting includes a plurality of detectors, each one of said paths having an emitter and a detector associated therewith, the apparatus further including means for intermittently actuating each emitter and actuating the detector associated with each path only when the emitter associated with such path is activated.

12. Apparatus as claimed in claim 11 wherein said means for emitting includes means for modulating the radiant energy emitted by each said emitter according to a predetermined modulation scheme and said means for detecting includes means associated with each said detector for selectively detecting radiant energy modulated according to said modulation scheme.

13. Apparatus as claimed in claim 1 wherein said means for emitting radiant energy includes means for emitting a plurality of substantially parallel, horizontally directed beams of radiant energy.

14. Apparatus as claimed in claim 13 wherein said means for emitting is arranged to emit said beams adjacent to a floor underlying said work area.

15. In a storage system of the type having a floor and a plurality of storage units disposed in a work area above said floor, said storage unit including a pair of end units spaced apart from one another in movement directions and at least one middle unit disposed therebetween, at least one of said storage units being moveable in said movement directions towards and away from other said storage units so as to open and close aisles between adjacent ones of said storage units, the improvement comprising:

(a) means for defining at least one passageway extending in said movement directions across each said middle unit;

(b) means for emitting radiant energy at an emission location and directing said radiant energy movement across each said aisle and through each said passageway to said detection location;

(c) means for detecting radiant energy at a detection location and providing a detector signal bearing information as to whether or not radiant energy is detected, said means for detecting radiant energy being operative to detect radiant energy emitted at said emission location regardless of movement of said storage units; and (d) means for determining from said detector signal whether or not an object is present in any aisle between said storage units.

16. A storage system as claimed in claim 15, wherein said storage units include a plurality of middle units and wherein said means for defining a passageway includes means for defining said passageways so that each passageway across each said middle unit is aligned with a passageway across each other middle unit.

17. A storage system as claimed in claim 16 wherein said means for detecting includes a plurality of detectors disposed in an array extending across said work area in a lengthwise direction transverse to said movement directions at one said end unit and said means for emitting includes a plurality of emitters disposed in an array extending lengthwise across said work area so that one said emitter is aligned with each said detector.

18. A storage system as claimed in claim 17 wherein said emitters are arranged to direct beams of radiant energy in said movement directions immediately above said floor and said means for defining passageways includes means for supporting each said middle unit above said radiant energy beams while permitting motion of such unit in said movement directions.

19. A storage system as claimed in claim 17 wherein said means for providing a detector signal includes means for providing a blocked-path signal for each said detector if energy from the emitter aligned therewith is not impinging upon such detector while such emitter is emitting, and wherein said means for determining includes means for issuing an object-present signal if said blocked-path signal is provided for any detector.

20. A storage system as claimed in claim 19 wherein said means for determining further includes logic means for monitoring changes in said blocked-path signals with time, determining from said changes whether cessation of a blocked-path signal is caused by lateral movement of the object which previously caused such signal out of said work area and, if not, issuing a lost-object signal.

21. A storage system as claimed in claim 20 further comprising means for inhibiting movement of said storage units responsive to either said blocked-path signal or said lost-object signal.

22. A storage system as claimed in claim 15 wherein said means for emitting is arranged to emit said radiant energy as one or more beams in said movement directions immediately above said floor.

* * * * *